United States Patent
Ogawa et al.

(10) Patent No.: US 6,773,374 B2
(45) Date of Patent: Aug. 10, 2004

(54) BRAKE NEGATIVE PRESSURE CONTROL APPARATUS AND METHOD, AND ENGINE CONTROL UNIT FOR INTERNAL COMBUSTION ENGINE

(75) Inventors: Ken Ogawa, Saitama-ken (JP); Choichi Sugawara, Saitama-ken (JP); Kazuyoshi Ishii, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 1 day.

(21) Appl. No.: 10/294,588

(22) Filed: Nov. 15, 2002

(65) Prior Publication Data

US 2003/0104904 A1 Jun. 5, 2003

(30) Foreign Application Priority Data

Dec. 3, 2001 (JP) ........................................ 2001/368455

(51) Int. Cl.$^7$ ............................................... B60K 41/20

(52) U.S. Cl. ........................ 477/183; 477/187; 477/203

(58) Field of Search ................................ 477/183, 187, 477/203

(56) References Cited

U.S. PATENT DOCUMENTS

| | | | | |
|---|---|---|---|---|
| 5,846,164 A | * | 12/1998 | Harada | 477/205 |
| 5,915,357 A | * | 6/1999 | Harada et al. | 477/203 |
| 6,120,414 A | * | 9/2000 | Endo et al. | 477/185 |
| 6,305,757 B1 | * | 10/2001 | Ohsaki et al. | 188/356 |
| 6,321,716 B1 | * | 11/2001 | Mashiki et al. | 123/295 |
| 6,352,491 B2 | * | 3/2002 | Mashiki et al. | 477/181 |

* cited by examiner

*Primary Examiner*—Charles A Marmor
*Assistant Examiner*—Dennis J. Abdelnour
(74) *Attorney, Agent, or Firm*—Arent Fox PLLC

(57) ABSTRACT

A brake negative pressure control apparatus and method, and an engine control unit for an internal combustion engine are provided for ensuring a negative pressure within a brake booster and a stable combustion while avoiding a complicated control. The brake negative pressure control apparatus comprises a negative pressure sensor for detecting a negative pressure within the brake booster, and an ECU for disabling the combustion mode to be set to the stratified combustion when the detected negative pressure is lower than a first predetermined negative pressure. The ECU controls a throttle valve opening in accordance with a target throttle valve opening in a homogeneous combustion mode when the ECU disables the combustion mode to be set to the stratified combustion.

12 Claims, 12 Drawing Sheets

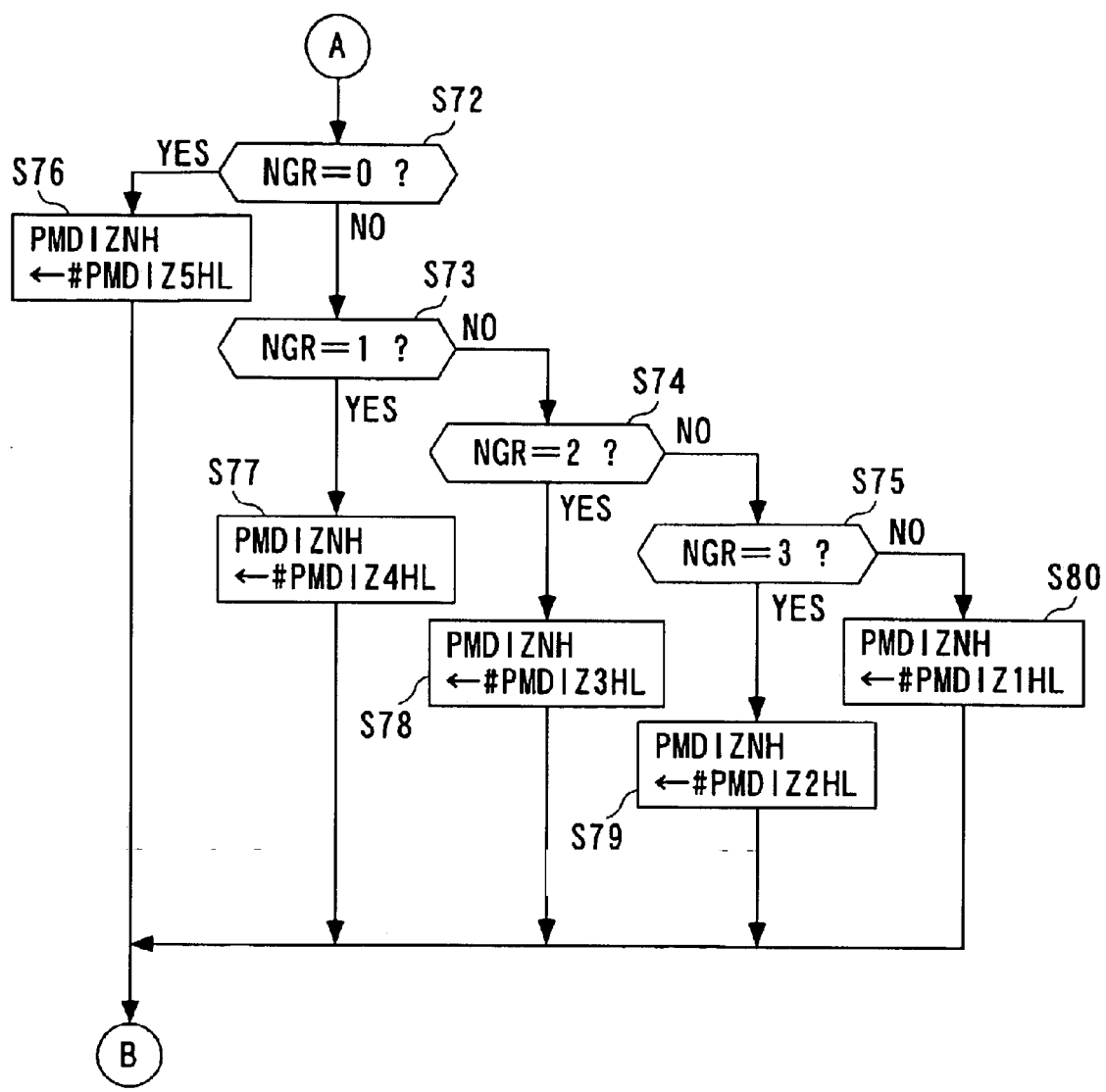
F I G. 6

BRAKE NEGATIVE PRESSURE CONTROL APPARATUS AND METHOD, AND ENGINE CONTROL UNIT FOR INTERNAL COMBUSTION ENGINE

BACKGROUND OF THE INVENTION

1. Field of the Invention

The present invention relates to a brake negative pressure control apparatus and method, and an engine control unit for an internal combustion engine of an in-cylinder direct fuel injection type which is configured to set a combustion mode to a stratified combustion or a homogeneous stoichiometric combustion in accordance with an operating condition of the internal combustion engine, and is equipped with a brake booster for increasing a braking force of a brake with a negative pressure introduced from an intake pipe.

2. Description of the Prior Art

A conventional control apparatus of the type mentioned above is disclosed in Japanese Patent No. 3003528. An internal combustion engine disclosed in this patent is an internal combustion engine of an in-cylinder direct fuel injection type which directly injects a fuel into cylinders. Specifically, the internal combustion engine injects a fuel in a compression stroke with a throttle valve being substantially fully opened, when the engine is lightly loaded, to perform a stratified combustion at an air/fuel ratio extremely leaner than the stoichiometric air/fuel ratio to improve the fuel economy and the like. In other operation regions, the engine injects the fuel in an intake stroke to perform a homogeneous combustion with an air/fuel mixture at the stoichiometric air/fuel ratio to ensure the power. The control apparatus utilizes a negative pressure within an intake pipe to detect a negative pressure within a brake booster for increasing a braking force of a brake, and forcedly controls the opening of the throttle value (hereinafter called the "throttle valve opening") in a closing direction from a reference opening by a correction opening when the detected negative pressure is lower than a predetermined negative pressure. The reference opening is set in accordance with an operating condition of the internal combustion engine, while the correction opening is set in accordance with the rotational speed and injected fuel amount of the internal combustion engine. When the throttle valve is controlled in the closing direction by the correction opening in the foregoing manner, the control apparatus sets the combustion mode to a homogeneous combustion mode for ensuring the ignition, and calculates fuel injection parameters (a fuel injection time, an ignition timing, and an opening of an EGR valve) for the homogeneous combustion mode.

The conventional control apparatus described above, however, implies the following problems. When a low negative pressure is detected within the brake booster, the control apparatus forcedly sets only the throttle valve opening in the closing direction, among other fuel injection parameters which have been previously set for the homogeneous combustion mode, throwing the fuel injection parameters out of balance to adversely affect the fuel economy, drivability, and exhaust gas characteristic. To eliminate such an inconvenience, if the fuel injection parameters for the homogeneous combustion mode are set to different values when the throttle valve opening is forcedly moved in the closing direction from those when the throttle opening is not so controlled, a complicated control is required to cause evil influences such as a requirement for a larger capacity of memory, an increased calculation time, and the like.

OBJECT AND SUMMARY OF THE INVENTION

The present invention has been made to solve the problems as mentioned above, and it is an object of the invention to provide a brake negative pressure control apparatus and method, and an engine control unit for an internal combustion engine which is capable of ensuring a negative pressure within a brake booster and a stable combustion while avoiding a complicated control.

To achieve the above object, according to a first aspect of the invention, there is provided a brake negative pressure control apparatus for an internal combustion engine of an in-cylinder direct fuel injection type which is configured to set a combustion mode to a stratified combustion or a homogeneous stoichiometric combustion based on a required output in accordance with at least an opening of an accelerator pedal and an operating condition of the internal combustion engine, and is equipped with a brake booster for increasing a braking force of a brake with a negative pressure introduced from an intake pipe.

The brake negative pressure control apparatus according to the first aspect of the invention is characterized by comprising negative pressure detecting means for detecting a negative pressure within the brake booster; combustion mode setting disabling means for disabling the combustion mode to be set to the stratified combustion when the detected negative pressure is lower than a first predetermined negative pressure; and control means for controlling a throttle valve opening in accordance with a target throttle valve opening in a homogeneous combustion mode when the combustion mode setting disabling means disables the combustion mode to be set to the stratified combustion.

According to this brake negative pressure control apparatus for an internal combustion engine, when the negative pressure within the brake booster is lower than the first predetermined negative pressure, the combustion mode is disabled to be set to the stratified combustion, i.e., the combustion mode is set to the homogeneous stoichiometric combustion. Thus, the negative pressure within the brake booster introduced from the intake pipe can be ensured by controlling the throttle valve opening based on the target throttle valve opening in accordance with the homogeneous combustion mode to maintain the negative pressure within the intake pipe. In addition, a stable combustion can be provided because of the combustion mode set to the homogeneous stoichiometric combustion. Unlike the conventional control apparatus, when an insufficient negative pressure is prevailing in the brake booster, a normal control in the homogeneous stoichiometric combustion is applied as it is to automatically close the throttle valve in sequence based on this control. Since this eliminates the need for forcedly closing the throttle valve, a complicated control can be avoided.

To achieve the above object, according to a second aspect of the invention, there is provided a brake negative pressure control method for an internal combustion engine of an in-cylinder direct fuel injection type which is configured to set a combustion mode to a stratified combustion or a homogeneous stoichiometric combustion based on a required output in accordance with at least an opening of an accelerator pedal and an operating condition of the internal combustion engine, and is equipped with a brake booster for increasing a braking force of a brake with a negative pressure introduced from an intake pipe.

The brake negative pressure control method according to the second aspect of the invention is characterized by comprising the steps of detecting a negative pressure within the brake booster; disabling the combustion mode to be set to the stratified combustion when the detected negative pressure is lower than a first predetermined negative pressure; and controlling a throttle valve opening in accordance with a target throttle valve opening in a homogeneous combustion mode when the combustion mode is disabled to be set to the stratified combustion.

This brake negative pressure control method provides the same advantageous effects as described above concerning the brake negative pressure control apparatus according to the first aspect of the invention.

To achieve the above object, according to a third aspect of the invention, there is provided an engine control unit including a control program for causing a computer to carry out control of a brake negative pressure for an internal combustion engine of an in-cylinder direct fuel injection type which is configured to set a combustion mode to a stratified combustion or a homogeneous stoichiometric combustion based on a required output in accordance with at least an opening of an accelerator pedal and an operating condition of the internal combustion engine, and is equipped with a brake booster for increasing a braking force of a brake with a negative pressure introduced from an intake pipe.

The engine control unit according to the third aspect of the invention is characterized in that the control program causes the computer to detect a negative pressure within the brake booster; disable the combustion mode to be set to the stratified combustion when the detected negative pressure is lower than a first predetermined negative pressure; and control a throttle valve opening in accordance with a target throttle valve opening in a homogeneous combustion mode when the combustion mode is disabled to be set to the stratified combustion.

This engine control unit provides the same advantageous effects as described above concerning the brake negative pressure control apparatus according to the first aspect of the invention.

Preferably, in the brake negative pressure control apparatus for an internal combustion engine, the combustion mode further includes a homogeneous lean combustion, wherein the combustion mode setting disabling means disables the combustion mode to be set to the stratified combustion and to the homogeneous lean combustion when the negative pressure is lower than the first predetermined negative pressure.

According to this preferred embodiment of the brake negative pressure control apparatus, when the negative pressure within the brake booster is lower than the first predetermined negative pressure, the combustion mode setting disabling means disables the combustion mode to be set to the stratified combustion and to the homogeneous lean combustion, so that the combustion mode is set to the homogeneous stoichiometric combustion. Since a negative pressure within the intake pipe is also low in the homogeneous lean combustion, the homogeneous lean combustion is disabled, and the combustion mode is set to the homogeneous stoichiometric combustion. Thus, a negative pressure can be maintained in the intake pipe to ensure a negative pressure within the brake booster and achieve a stable combustion without fail.

Preferably, in the brake negative pressure control method for an internal combustion engine, the combustion mode further includes a homogeneous lean combustion, wherein the step of disabling setting of the combustion mode includes disabling the combustion mode to be set to the stratified combustion and to the homogeneous lean combustion when the negative pressure is lower than the first predetermined negative pressure.

This preferred embodiment of the brake negative pressure control method provides the same advantageous effects as provided by the corresponding preferred embodiment of the brake negative pressure control apparatus.

Preferably, in the engine control unit, the combustion mode further includes a homogeneous lean combustion, wherein the control program causes the computer to disable the combustion mode to be set to the stratified combustion and to the homogeneous lean combustion when the negative pressure is lower than the first predetermined negative pressure.

This preferred embodiment of the engine control unit provides the same advantageous effects as provided by the corresponding preferred embodiment of the brake negative pressure control apparatus.

Preferably, in the brake negative pressure control apparatus for an internal combustion engine, the combustion mode setting disabling means releases the disabled combustion mode when the negative pressure is increased to be higher than the first predetermined pressure which is higher than the first predetermined negative pressure while the combustion mode setting disabling means disables the combustion mode to be set to the stratified combustion and to the homogeneous lean combustion.

According to this preferred embodiment of the brake negative pressure control apparatus, the combustion mode setting disabling means releases the disabled combustion mode when the negative pressure is increased to be higher than the second predetermined pressure, while the combustion mode setting disabling means disables the combustion mode to be set to the stratified combustion and to the homogeneous lean combustion, on the assumption that the negative pressure within the brake booster has been recovered to such an extent that it can amplify the braking force of the brake. It is therefore possible to minimize an exacerbated fuel economy caused by disabling the stratified combustion and the like. In addition, the combustion mode can be stably switched without causing hunting by setting the second predetermined negative pressure larger than the first predetermined negative pressure.

Preferably, in the brake negative pressure control method for an internal combustion engine, the step of disabling setting of the combustion mode includes releasing the disabled combustion mode when the negative pressure is increased to be higher than the first predetermined pressure which is higher than the first predetermined negative pressure while the combustion mode is disabled to be set to the stratified combustion and to the homogeneous lean combustion.

This preferred embodiment of the brake negative pressure control method provides the same advantageous effects as provided by the corresponding preferred embodiment of the brake negative pressure control apparatus.

Preferably, in the engine control unit, the control program further causes the computer to release the disabled combustion mode when the negative pressure is increased to be higher than the first predetermined pressure which is higher than the first predetermined negative pressure while the combustion mode is disabled to be set to the stratified combustion and to the homogeneous lean combustion.

This preferred embodiment of the engine control unit provides the same advantageous effects as provided by the corresponding preferred embodiment of the brake negative pressure control apparatus.

Preferably, in the brake negative pressure control apparatus for an internal combustion engine, the combustion mode setting disabling means continues to disable the stratified combustion and the homogeneous lean combustion when the required output is larger than a predetermined upper limit output after the negative pressure is increased beyond the second predetermined negative pressure.

According to this preferred embodiment of the brake negative pressure control apparatus, even if the negative pressure is recovered, the combustion mode setting disabling means continues to disable the combustion modes, given a higher priority to the output torque of the engine, thereby making it possible to set a combustion mode suitable for an operating condition of the engine.

Preferably, in the brake negative pressure control method for an internal combustion engine, the step of disabling setting of the combustion mode includes continuously disabling the stratified combustion and the homogeneous lean combustion when the required output is larger than a predetermined upper limit output after the negative pressure is increased beyond the second predetermined negative pressure.

This preferred embodiment of the brake negative pressure control method provides the same advantageous effects as provided by the corresponding preferred embodiment of the brake negative pressure control apparatus.

Preferably, in the engine control unit, the control program further causes the computer to continuously disable the stratified combustion and the homogeneous lean combustion when the required output is larger than a predetermined upper limit output after the negative pressure is increased beyond the second predetermined negative pressure.

This preferred embodiment of the engine control unit provides the same advantageous effects as provided by the corresponding preferred embodiment of the brake negative pressure control apparatus.

BRIEF DESCRIPTION OF THE DRAWINGS

FIGS. 5 and 6 are flow charts illustrating in combination a subroutine for determining a stratified combustion region at step 2 in FIG. 2;

DETAILED DESCRIPTION OF THE PREFERRED EMBODIMENT

Figure 1:
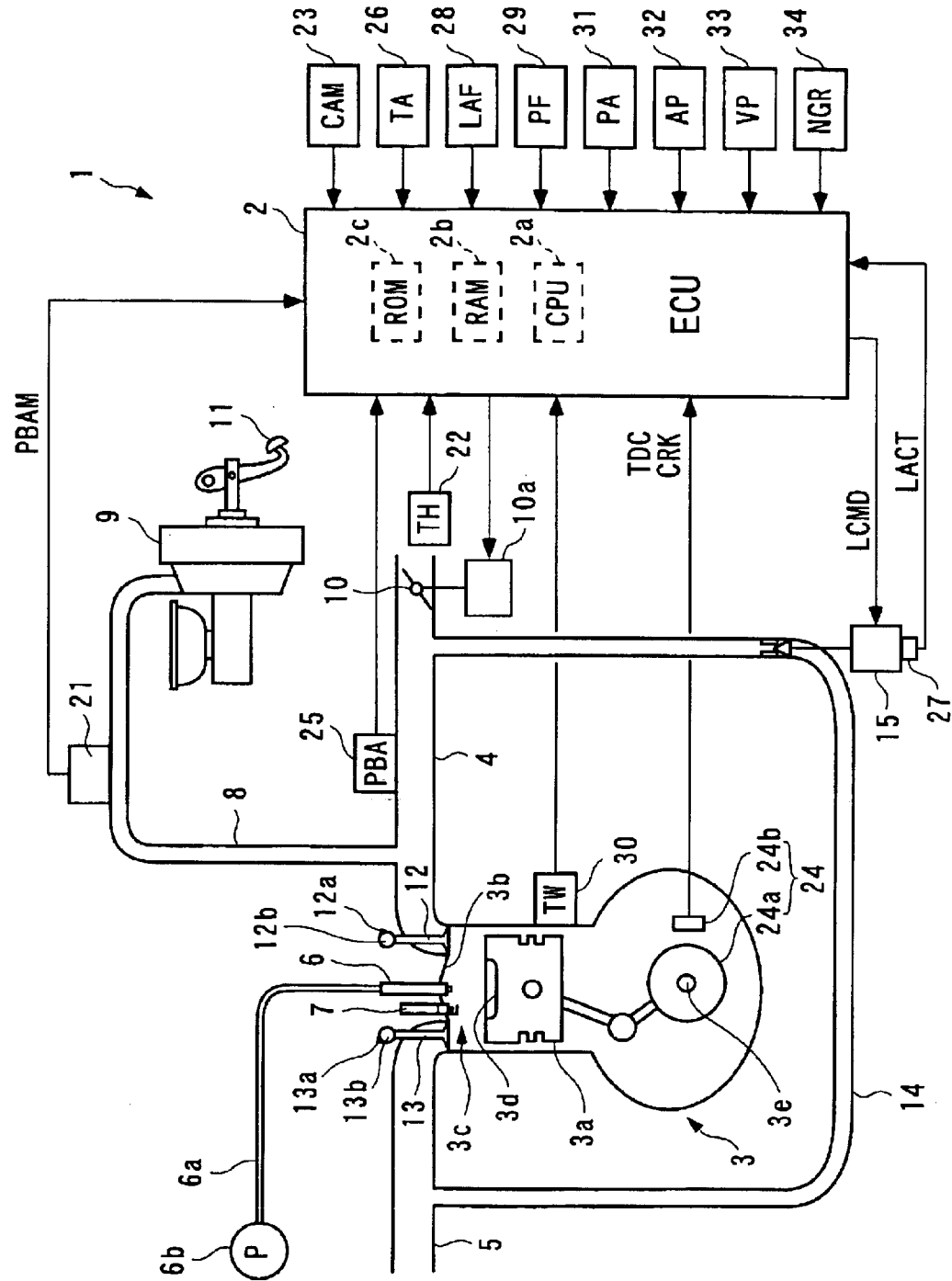
FIG. 1 is a schematic diagram generally illustrating a brake negative pressure control apparatus for an internal combustion engine according to one embodiment of the present invention, and an internal combustion engine which applies the brake negative pressure control apparatus.

In the following, a preferred embodiment of the present invention will be described in detail with reference to the accompanying drawings. FIG. 1 generally illustrates the configuration of a brake negative pressure control apparatus 1 for an internal combustion engine which embodies the present invention. The illustrated brake negative pressure control apparatus 1 comprises an electronic engine control unit (including combustion mode setting disabling means. Hereinafter called the "ECU 2"). The ECU 2 executes control routines, as will be later described.

An internal combustion engine (hereinafter called the "engine") 3 is a direct four-cylinder (only one of which is shown) type gasoline engine for a vehicle, not shown. A combustion chamber 3c is formed between a piston 3a and a cylinder head 3b of each cylinder. A recess 3d is formed in a central portion of an upper face of the piston 3a. The cylinder head 3b is provided with an intake pipe 4 and an exhaust pipe 5, respectively, and also with a fuel injection valve (hereinafter called the "injector") 6 and an ignition plug 7 which are attached to face the combustion chamber 3c. In summary, the engine 3 is of a cylinder direction injection type which directly injects a fuel into the combustion chamber 3c by the injector 6.

The intake pipe 4 is connected to a brake booster 9 through a branch pipe 8. The brake booster 9 is comprised of a circular diaphragm made of rubber, and the like. The brake booster 9 is applied with a negative pressure which is generated by closing a throttle valve 10 disposed in the intake pipe 4. This negative pressure supplied in the brake booster 9 amplifies a treading force on a brake pedal 11 trodden down by the operator. A negative pressure sensor 21 is disposed in the branch pipe 8 for detecting an absolute value PBAM of the negative pressure within the brake booster 9 (hereinafter called the "master back pressure"). The detected signal PBAM is outputted to the ECU 2.

The throttle valve 10 is coupled to an electric motor 10a which controls a throttle valve opening TH. A throttle valve opening sensor 22 is also connected to the throttle valve 10 for detecting the throttle valve opening TH. A detected signal is outputted to the ECU 2. The ECU 2 controls the throttle valve opening TH through the electric motor 10a in accordance with an operating condition of the engine 3 to control the amount of intake air to the engine 3.

The intake pipe 4 and exhaust pipe 5 are provided with an intake valve 12 and an exhaust pipe 13, respectively. These intake valve 12 and exhaust pipe 13 are driven to open and close by an intake cam 12a and an exhaust cam 13a which are fitted on an intake cam shaft 12b and an exhaust cam shaft 13b, respectively. The intake and exhaust cam shafts 12b, 13b are coupled to a crank shaft 3e through a timing belt, not shown, and the like, and are rotated once each time the crank shaft 3e is rotated twice. The intake cam shaft 12b is also provided with a cam phase varying mechanism (not shown) for changing a cam phase CAIN of the intake cam 12a with respect to the crank shaft 3e.

The intake cam shaft 12b is also provided with a cam angle sensor 23. The cam angle sensor 23, which is comprised, for example, of a magnet rotor and an MRE pickup, outputs a pulsed CAM signal to the ECU 2 every predetermined cam angle (for example, every 1°) as the intake cam shaft 12b is rotated. The ECU 2 calculates the actual cam phase CAIN using the CAM signal and a CRK signal, later described.

A magnet rotor 24a is attached to the crank shaft 3e. The magnet rotor 24a comprises the crank angle sensor 24 together with an MRE pickup 24b. The crank angle sensor 24 outputs the CRK signal and a TDC signal, both of which are pulse signals, as the crank shaft 3e is rotated.

One pulse of the CRK signal is outputted every predetermined crank angle (for example, every 3°). The ECU 2 calculates a rotational speed of the engine 3 (hereinafter called the "engine rotational speed") NE based on the CRK signal. The TDC signal is a signal indicating that the piston 3a of each cylinder is at a predetermined crank angle position near the top dead center (TDC) at the start of an intake stroke. In this example which is related to a four-cylinder type engine, one pulse is outputted every 180° of crank angle. The engine 3 is also provided with a cylinder discriminating sensor, not shown. The cylinder discriminating sensor sends to the ECU 2 a cylinder discriminating signal which is a pulse signal for discriminating a cylinder. The ECU 2 relies on these cylinder discriminating signal, CRK signal, and TDC signal to discriminate a crank angle position for each cylinder.

An absolute intake pipe inner pressure sensor 25 is disposed at a location downstream of the throttle valve 10 in the intake pipe 4. The absolute intake pipe inner pressure sensor 25, which comprises a semiconductor pressure sensor or the like, detects an absolute intake pipe inner pressure PBA which is the absolute pressure within the intake pipe 4, and sends a detection signal indicative of the absolute intake pipe inner pressure PBA to the ECU 2. An intake air temperature sensor 26 is also attached to the intake pipe 4. The intake air temperature sensor 26, which comprises a thermistor, detects an intake air temperature TA within the intake pipe 4, and sends a detection signal indicative of the intake air temperature TA to the ECU 2.

An EGR pipe 14 is connected between a location of the intake pipe 4 downstream of the throttle valve 10 and a location of the exhaust pipe 5 upstream of a catalyzer, not shown. The EGR pipe 14 executes an EGR operation by recirculating exhaust gases of the engine 3 to the intake side to reduce a combustion temperature within the combustion chamber 3c to reduce NOx within the exhaust gases.

An EGR control valve 15 is disposed in the EGR pipe 14. The EGR control valve 15 is a linear electromagnetic valve which is responsive to a driving signal from the ECU 2 to linearly change its valve lifting amount to open and close the EGR pipe 14. A valve lifting amount sensor 27 is attached to the EGR control valve 15. The valve lifting amount sensor 27 detects an actual valve lifting amount LACT of the EGR control valve 21, and sends a detection signal indicative of the valve lifting amount LACT to the ECU 2.

The ECU 2 retrieves a target valve lifting amount LCMD for the EGR control valve 15 in accordance with an operating condition of the engine 3, and controls the actual valve lifting amount LACT to match the target valve lifting amount LCMD to control the EGR amount. The retrieval of the target valve lifting amount LCMD will be described later.

An LAF sensor 28 is disposed at a location of the exhaust pipe 5 upstream of the catalyzer. The LAF sensor 28, which is comprised of zirconia and platinum electrodes and the like, linearly detects an oxygen concentration within exhaust gases in a wide air/fuel ratio (A/F) region from a rich region richer than the stoichiometric air/fuel ratio to an extremely lean region, and sends a detection signal proportional to the detected oxygen concentration to the ECU 2.

The injector 6 is disposed in a central portion of a top wall of the combustion chamber 3c, and is connected to a fuel pump 6b through a fuel pipe 6a. A fuel from a fuel tank, not shown, is pumped by the fuel pump 6b to a high pressure, and regulated by a regulator (not shown) before it is supplied to the injector 6. The fuel is injected toward the recess 3d of the piston 3a from the injector 6, and impinges on the upper face of the piston 3a including the recess 3d to form a fuel jet stream. Particularly, in a stratified combustion, later described, a majority of fuel injected from the injector 6 impinges on the recess 3d to form a fuel jet stream.

A fuel pressure sensor 29 is attached in the fuel pipe 6a near the injector 6. The fuel pressure sensor 29 detects the pressure PF of the fuel injected from the injector 6, and sends a detection signal indicative of the fuel pressure PF to the ECU 2. The injector 6 is also connected to the ECU 2 which controls, through driving signals therefrom, a fuel injection time Tout (injected fuel amount) or a valve opening time, and fuel injection timings θinj (a valve opening timing and a valve closing timing) for the injector 6.

A water temperature sensor 30 and an atmospheric pressure sensor 31 are attached to the body of the engine 3. The water temperature sensor 30, which comprises a thermistor, detects an engine water temperature TW which is the temperature of cooling water circulating within the body of the engine 3. The atmospheric pressure sensor 31 in turn comprises a semiconductor pressure sensor or the like, and detects an atmospheric pressure PA. These detection signals are sent to the ECU 2.

The vehicle equipped with the engine 3 includes an acceleration opening sensor 32 and a vehicle speed sensor 33. The acceleration opening sensor 32 detects an acceleration opening AP which indicates a force applied to an accelerator pedal, not shown, trodden by the operator. The vehicle speed sensor 33 in turn detects a vehicle speed VP. These detection signals are sent to the ECU 2. A gear stage sensor 34 is further attached to an automatic transmission, not shown, of the engine 3. The gear stage sensor 34 detects a gear stage of the automatic transmission, and sends an output signal indicative of a shift position NGR corresponding to the gear stage to the ECU 2. The shift position NGR is set to any of "4" to "0" when the automatic transmission has first to fifth speed gear stages.

The ECU 2 is based on a microcomputer (not shown) which comprises a CPU 2a, a RAM 2b, a ROM 2c, an input/output interface (not shown), and the like. The detection signals from the aforementioned sensors 21–33 are inputted to the ECU 2, subjected to an A/D conversion and waveform reshaping in the input interface, and then inputted to the CPU 2a. The CPU 2a executes a variety of calculations based on a control program, a variety of tables and maps, later described, stored in the ROM 2c, as well as flag values, later described, calculated values and the like stored in the RAM 2b in accordance with the input signals.

Specifically, the CPU 2a determines an operating condition of the engine 3 from a variety of the detection signals, and switches a combustion mode of the engine 3 (combustion mode), based on the result of the determination, to a stratified combustion mode during an extremely low load operation such as an idling operation, and to a homogeneous combustion mode during an operation other than the extremely low load operation. The CPU 2a also executes a twice-injection combustion mode at the time of the switching. Also, the CPU 2a controls the fuel injection time Tout and fuel injection timings θinj for the injector 6 in accordance with a selected combustion mode to conduct a fuel injection control including an air/fuel ratio feedback control.

In the stratified combustion mode, a fuel is injected into the combustion chamber 3c from the injector 6 in a compression stroke, such that a majority of the injected fuel impinges on the recess 3d to from a fuel jet stream. An air/fuel mixture is produced with the fuel jet stream and an air flow coming from the intake pipe 4. The air/fuel mixture is biased to the vicinity of the ignition plug 7, and burnt at an air/fuel ratio A/F (for example, 27–60) extremely leaner than the stoichiometric air/fuel ratio when the piston 3a is at a position near the top dead center in the compression stroke.

In the homogeneous combustion mode, the fuel is injected into the combustion chamber 3c in an intake stroke to uniformly distribute an air/fuel mixture produced with a fuel jet stream and an air flow over the combustion chamber 3c. The air/fuel mixture is uniformly burnt at an air/fuel ratio A/F (for example, 12–22) richer than in the stratified combustion mode.

Further, in the twice-injection combustion mode, the fuel is injected twice at intervals in one cycle to burn an air/fuel mixture at an air/fuel ratio A/F (for example, 12–22) richer than in the stratified combustion mode. In this event, the fuel is injected twice, one each in an intake stroke and a compression stroke.

Figure 12:
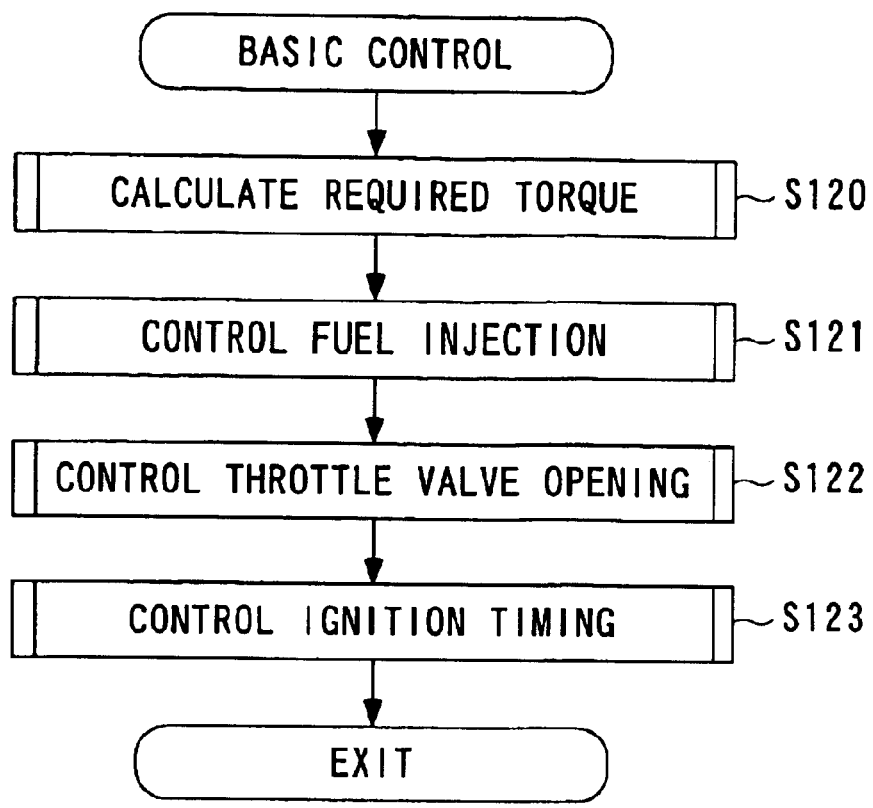
FIG. 12 is a flow chart illustrating a main routine of a basic control for an engine 3.

FIG. 12 illustrates a main routine for a basic control for the engine 3. This routine interrupts in synchronism with an inputted TDC signal for execution. This routine includes a required torque retrieval for retrieving a required torque PMCMDREG (at step 120), a fuel injection control (at step 121), a throttle valve opening control (at step 122) in accordance with the retrieved required torque PMCMDREG and the like, and an ignition timing control (at step 123). In the following, these operations will be described one by one in detail.

Figure 13:
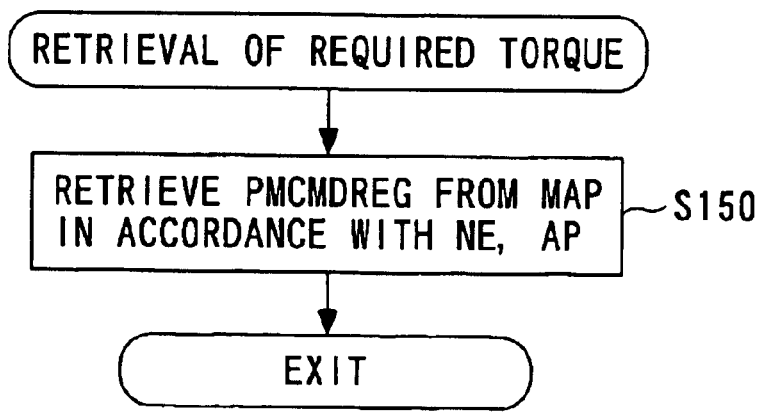
FIG. 13 is a flow chart illustrating a subroutine for finding a required torque.

FIG. 13 is a flow chart illustrating a subroutine for finding a required torque. Specifically, the CPU 2a retrieves the required torque PMCMDREG from a map, not shown, based on the engine rotational speed NE and acceleration opening AP (step 150).

Figure 2:
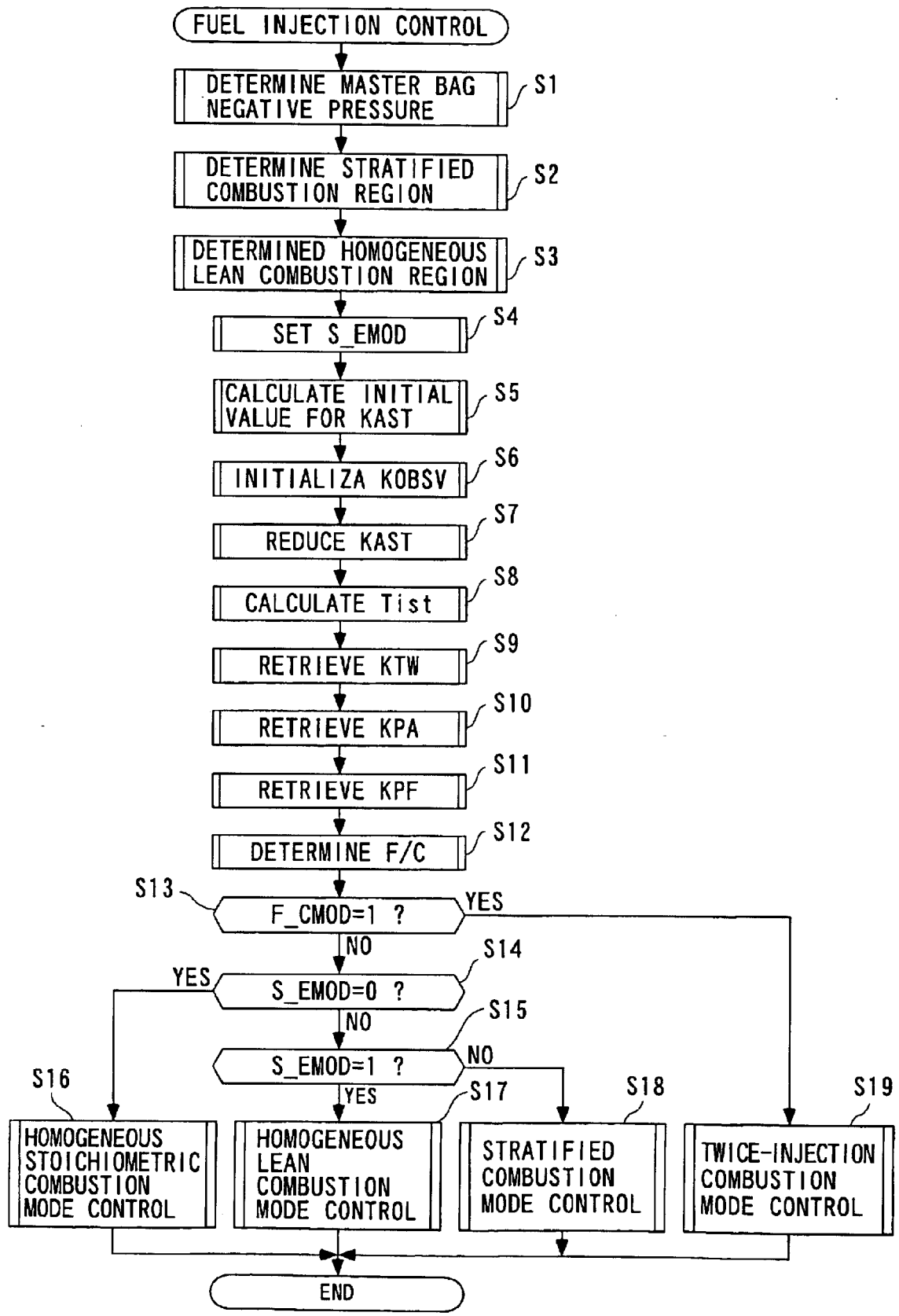
FIG. 2 is a flow chart illustrating a main routine of a fuel injection control.

FIG. 2 illustrates a main routine of a fuel injection control at step 121 in FIG. 12. As described later, this routine includes a master back negative pressure determination for determining whether or not a sufficient negative pressure is ensured in the brake booster 9 for amplifying a braking force of the brake (step 1), a determination as to whether a stratified combustion and a homogeneous lean combustion are possible from the result of determination at step 1 and an operating condition of the engine 3 (steps 2, 3), a setting of a combustion mode monitor S_EMOD (step 5), calculations of a variety of correction coefficients (steps 6–13), and a variety of combustion mode controls in accordance with a combustion mode transition flag F_COM and the combustion mode monitor S_EMOD (steps 14–20).

First, at step 1 (labelled "S1" in the figure. The same applies to the following description), the CPU 2a determines how the master back negative pressure is. This determination will be described later.

Next, at steps 2, 3, the CPU 2a determines a stratified combustion region and a homogeneous lean combustion region, respectively. These determinations will be described later.

At next step 4, the CPU 2a sets the combustion mode in accordance with the results of the determinations at steps 2, 3, and sets the combustion mode monitor S_EMOD indicative of the set combustion mode. The CPU 2a sets the combustion mode to the stratified combustion mode when the combustion mode monitor S_EMOD is set to "2"; to the homogeneous lean combustion mode when it is set to "1"; and to the homogeneous stoichiometric combustion mode when it is set to "0." Details on this setting will be described later.

Next, the routine proceeds to step 5, where the CPU 2a calculates an initial value for a start correction coefficient KAST. The start correction coefficient KAST is provided for incrementally correcting an injected fuel amount at the start of the engine 3.

Next, the routine proceeds to step 6, where the CPU 2a initializes a correction coefficient KOBSV. This correction coefficient KOBSV is used in an A/F feedback control (at step 46), later described.

Next, the routine proceeds to step 7, where the CPU 2a reduces the start correction coefficient KAST calculated at step 5. This operation is performed to reduce the magnitude of the incremental correction for the injected fuel amount with the start correction coefficient KAST over time after the start of the engine 3.

Next, the routine proceeds to step 8, where the CPU 2a calculates a basic fuel injection time Tist for starting.

Next, the routine proceeds to step 9, where the CPU 2a retrieves a water temperature correction coefficient KTW from a map, not shown, based on the engine water temperature TW and absolute intake pipe inner pressure PBA.

Next, the routine proceeds to step 10, where the CPU 2a an atmospheric pressure correction coefficient KPA from a table, not shown, for based on the atmospheric pressure PA.

Next, the routine proceeds to step 11, where the CPU 2a retrieves a fuel pressure correction coefficient KPF. The fuel pressure correction coefficient KPF is retrieved from a table, not shown, based on a differential pressure ΔPF between a fuel pressure PF and a cylinder inner pressure PCYL. In this event, the cylinder inner pressure PCYL is estimated by searching a table, not shown, based on the crank angle position of each cylinder.

Next, the routine proceeds to step 12, where the CPU 2a determines an F/C operation. Specifically, the CPU 2a determines whether or not the engine 3 is in a fuel cut (hereinafter called the "F/C") operating condition in accordance with the engine rotational speed NE, throttle valve opening TH, and the like, and sets a flag indicative of the result of the determination.

Next, the routine proceeds to step 13, where it is determined whether or not the combustion mode transition flag F_CMOD is "1." The combustion mode transition flag F_CMOD is set to "1" in a twice injection combustion mode, and to "0" in the remaining combustion modes.

If the result of determination at step 13 is NO, i.e., when the engine 3 is in a combustion mode other than the twice injection combustion mode, the routine proceeds to step 14, where it is determined whether or not the combustion mode monitor S_EMOD set at step 4 is "0." If the result of determination at step 14 is YES, the routine proceeds to step 16, where the CPU 2a conducts a homogeneous stoichiometric combustion mode control, later described, followed by termination of the fuel injection control main routine. The homogeneous stoichiometric combustion mode includes a rich combustion for burning an air/fuel mixture at an air/fuel ratio A/F richer than the stoichiometric air/fuel ratio, in addition to a combustion for burning the air/fuel mixture mainly at the stoichiometric air/fuel ratio. In the following, the stoichiometric combustion used herein also includes the rich combustion.

On the other hand, if the result of determination at step 14 is NO, i.e., when the engine 3 is in a combustion mode other than the homogeneous stoichiometric combustion mode, the routine proceeds to step 15, where it is determined whether or not the combustion mode monitor S_EMOD is "1." If the result of determination at step 15 is YES, i.e., when in the homogeneous lean combustion mode, the routine proceeds to step 17, where the CPU 2a conducts the homogeneous lean combustion mode control, followed by termination of the fuel injection control main routine.

On the other hand, if the result of determination at step 15 is NO, i.e., when in the stratified combustion mode, the routine proceeds to step 18, where the CPU 2a conducts the stratified combustion mode control, followed by termination of the fuel injection control main routine.

On the other hand, if the result of determination at step 13 is YES, i.e., when F_CMOD=1, the routine proceeds to step 19, where the CPU 2a conducts the twice injection combustion mode control, followed by termination of the fuel injection control main routine.

Figure 3:
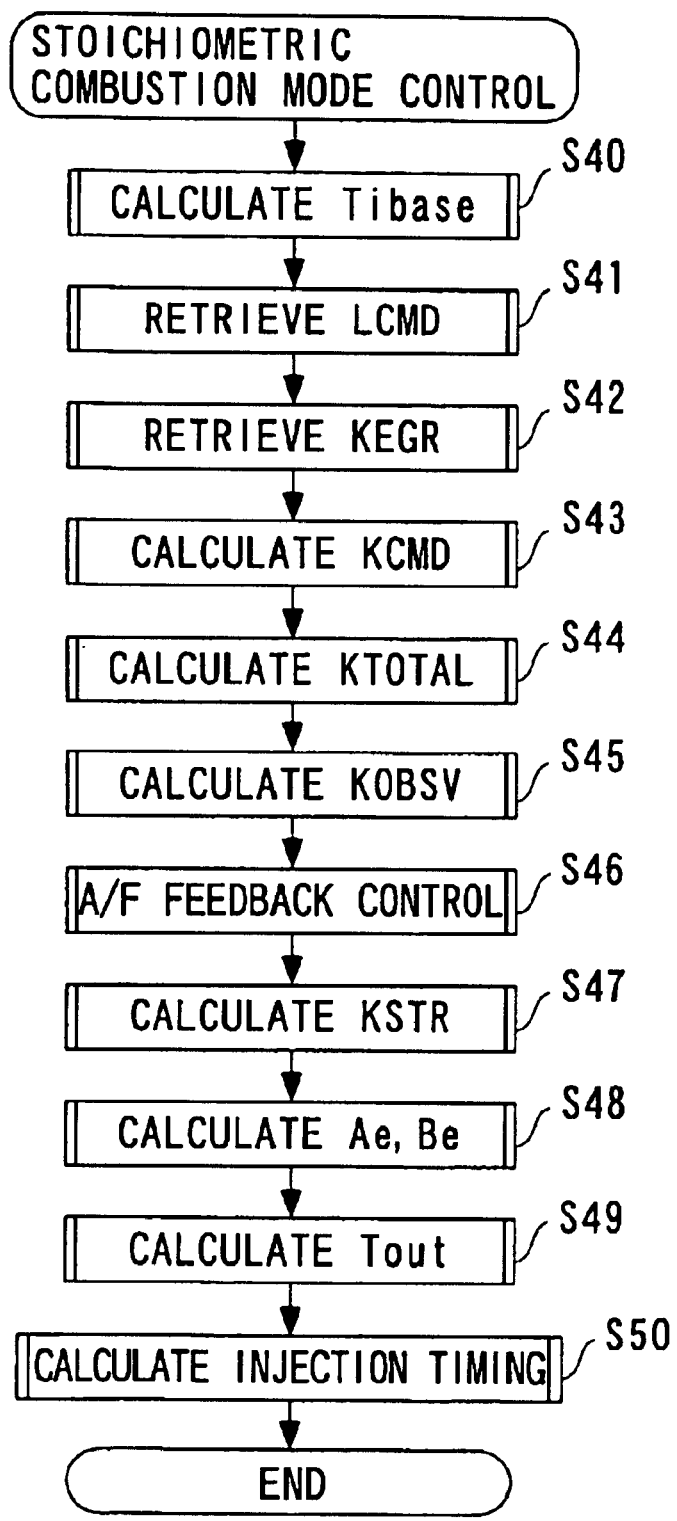
FIG. 3 is a flow chart illustrating a subroutine for a homogeneous stoichiometric combustion mode control at step 16 in FIG. 2.

Next, a subroutine for the homogeneous stoichiometric combustion mode control at step 16 in FIG. 2 will be described with reference to FIG. 3. As illustrated, the CPU 2a first calculates a basic fuel injection time Tibase at step 40. The basic fuel injection time Tibase is calculated by the following equation (1) using a multiplication term Ati, an addition term Bti, and the absolute intake pipe inner pressure PBA:

$$\text{Tibase} = Ati \cdot PBA + Bti \tag{1}$$

where Ati and Bti are found by searching a map, not shown, based on the engine rotational speed NE and actual cam phase CAIN.

Next, the subroutine proceeds to step 41, where the CPU 2a retrieves a target valve lifting amount LCMD. The target valve lifting amount LCMD is retrieved when the EGR pipe 14 is opened to execute the EGR. Specifically, the CPU 2a searches maps, not shown, set for the homogeneous stoichiometric combustion, homogeneous lean combustion, idling operation during the stratified combustion, and non-idling operation during the stratified combustion based on the engine rotational speed NE and the required torque PMCMDREG retrieved from the map in the subroutine of FIG. 13 to find the target valve lifting amount LCMD for each of the combustion modes.

Next, the subroutine proceeds to step 42, where the CPU 2a retrieves an EGR correction coefficient KEGR. Specifically, the CPU 2a searches three maps, not shown, based on the required torque PMCMDREG, engine rotational speed NE, target valve lifting amount LCMD retrieved at step 41, actual valve lifting amount LACT detected by the valve lifting amount sensor 27, absolute intake pipe inner pressure PBA, and a map value PBAm of the absolute intake pipe inner pressure PBA to find the EGR correction coefficient KEGR. The EGR correction coefficient KEGR is found for compensating for a change in the intake air amount due to a change in the EGR amount.

Next, the subroutine proceeds to step 43, where the CPU 2a calculates a final target air/fuel ratio coefficient KCMD. Specifically, the CPU 2a first searches a map, not shown, based on the required torque PMCMDREG and engine rotational speed NE to find a basic target air/fuel ratio coefficient KBS. Then, the CPU 2a multiplies the basic target air/fuel ratio coefficient KBS by the water temperature correction coefficient KTW retrieved at step 9 to calculate the final target air/fuel ratio coefficient KCMD. These basic target air/fuel ratio coefficient KBS and final target air/fuel ratio coefficient KCMD are represented as equivalence ratios proportional to the inverse of the air/fuel ratio A/F.

Next, the subroutine proceeds to step 44, where the CPU 2a calculates a total correction coefficient KTOTAL. Specifically, the total correction coefficient KTOTAL is calculated by the following equation (2):

$$KTOTAL = KAST \cdot KTA \cdot KPA \cdot KEGR \cdot KETC \tag{2}$$

where KTA is an intake air temperature correction coefficient retrieved from a table, not shown, based on the intake air temperature TA, and KETC is a filling efficiency correction coefficient retrieved from a table, not shown, based on the final target air/fuel ratio coefficient KCMD.

Next, the subroutine proceeds to step 45, where the correction coefficient KOBSV is calculated. Specifically, an observer estimates an air/fuel ratio for each cylinder to calculate the correction coefficient KOBSV which is used at next step 46.

Next, the subroutine proceeds to step 46, where the CPU 2a conducts an A/F feedback control. Specifically, the CPU 2a conducts an estimated air/fuel ratio feedback control for each cylinder using the final target air/fuel ratio coefficient KCMD and correction coefficient KOBSV calculated at steps 43, 46, respectively.

Next, the subroutine proceeds to step 47, where a feedback correction coefficient KSTR is calculated. Specifically, a self tuning regulator type adaptive controller, not shown, is used to calculate the feedback correction coefficient KSTR based on the detection signal from the LAF sensor 28. The feedback correction coefficient KSTR is applied as a correction coefficient for the basic fuel injection time Tibase for dynamically compensating for a delay in bringing the actual air/fuel ratio to a target air/fuel ratio due to a response delay of a fuel injection system to improve the convergence of the air/fuel ratio feedback control.

Next, the subroutine proceeds to step 48, where the CPU 2a calculates a direct ratio Ae and a carry-away ratio Be. Specifically, the CPU 2a calculates the direct ratio Ae and carry-away ratio Be, which are fuel behavior parameters, from the engine rotational speed NE, absolute intake pipe inner pressure PBA, and parameters indicative of a variety of operating conditions.

Next, the subroutine proceeds to step 49, where the CPU 2a calculates the fuel injection time Tout. Specifically, the CPU 2a calculates a required fuel injection time Tcyl (i) for each cylinder by multiplying the basic fuel injection time Tibase calculated as described above by the total correction coefficient KTOTOL, final target air/fuel ratio coefficient KCMD, and feedback correction coefficient KSTR, and adding the correction value TiDB to the resulting product (Tcyl(i)=Tibase·KTOTAL·KCMD·KSTR+TiDB), where the character i in the required fuel injection time Tcyl(i) represents a cylinder number.

Next, the CPU 2a calculates a fuel injection time Tout(i) for each cylinder using the previously calculated fuel pressure correction coefficient KPF, direct ratio Ae, and carry-away ratio Be in accordance with the following equation (3). These fuel injection times Tout(i) indicate valve opening times of the injectors 6 for the respective cylinders, and the amounts of fuels actually injected into the respective cylinders.

$$Tout(i) = ((Tcyl(i) - Be \cdot TWP(i))/Ae) \cdot KPF + TiVB \quad (3)$$

where TiVB is an invalid correction time calculated based on a battery voltage, and TWP(i) is a value (time) equivalent to the amount of sticking fuel for each cylinder. The value TWP(i) is calculated in accordance with the following equation (4) in a calculation of TWP(i) which is made separately from the homogeneous stoichiometric combustion mode control.

$$TWP(i)n = (Tout(i) - TiVB)/KPF) \cdot (1 - Ae) + (1 - Be) \cdot TWP(i)n - 1 \quad (4)$$

where TWP(i)n and TWP(i)n−1 are a current value and the preceding value of the sticking fuel equivalent amount value TWP(i), respectively.

Next, the subroutine proceeds to step 50, where the CPU 2a calculates a fuel injection timing θinj. Specifically, the fuel injection timing θinj is calculated back from an injection end timing and the fuel injection time Tout calculated at step 49. The injection end timing is retrieved from a map, not shown, in accordance with whether or not the EGR is executed, and the like.

Respective procedures for the homogeneous lean combustion mode control, stratified combustion mode control, and twice injection combustion mode control are basically identical to steps 40–50 of the aforementioned homogeneous stoichiometric combustion mode control, so that specific description thereon is omitted.

Figure 4:
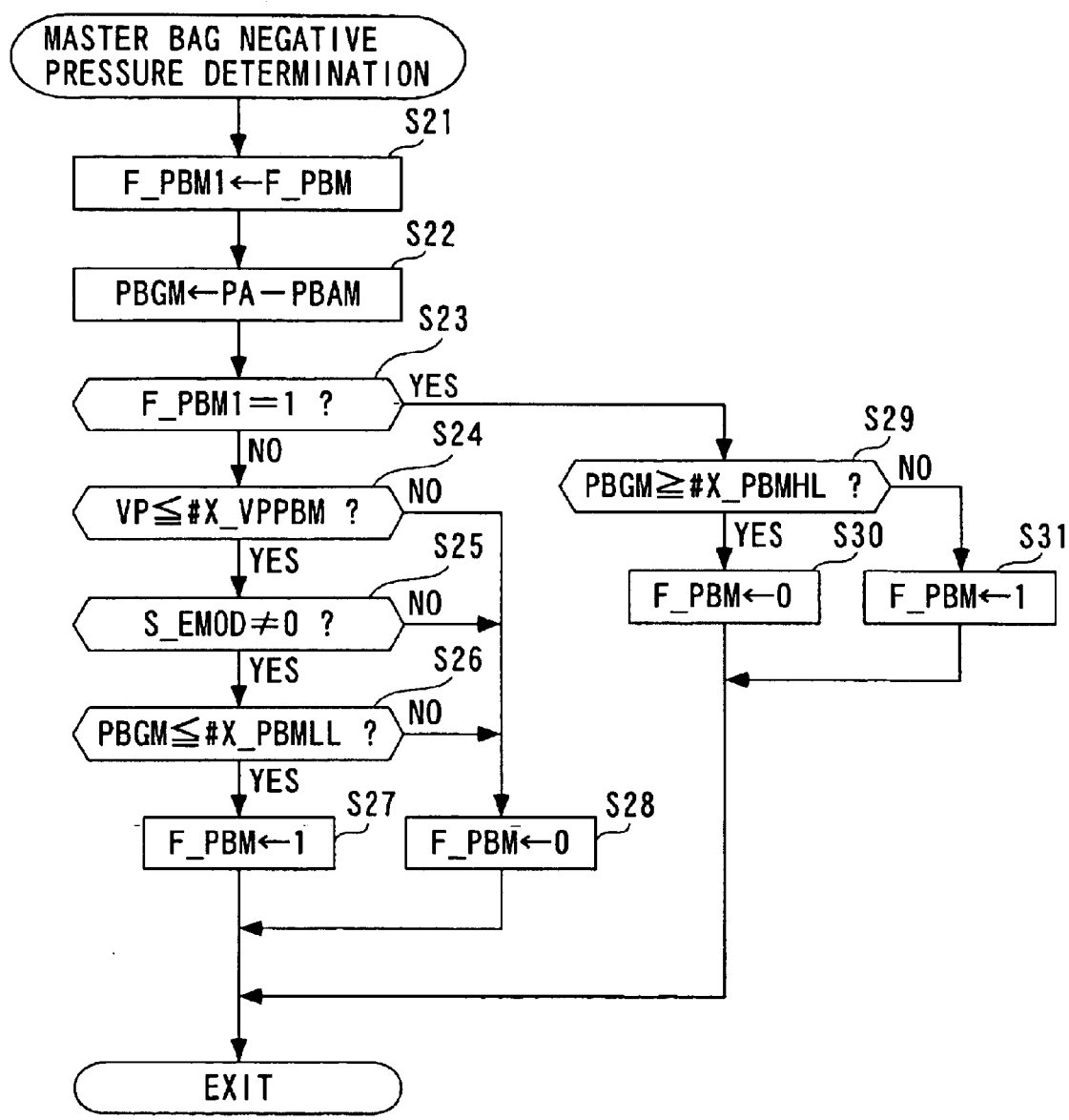
FIG. 4 is a flow chart illustrating a subroutine for determining a master back pressure at step 1 in FIG. 2.

FIG. 4 is a flow chart illustrating a subroutine executed at step 1 in FIG. 2 for determining a master bag negative pressure. First at step 21, the CPU 2a sets a current master bag negative pressure request flag F_PBM as its preceding value F_PBM1. The master bag negative pressure request flag F_PBM is set to "1" on the assumption that a negative pressure is requested, when it is determined that a sufficient negative pressure is not ensured in the brake booster 9 so that the negative pressure should be boosted, as described later. Next, the CPU 2a subtracts a master bag pressure PBAM detected by the negative pressure sensor 21 from the atmospheric pressure PA detected by the atmospheric pressure sensor 31, and sets the resulting value as a master bag gage pressure PBGM (step 22).

Next, it is determined whether or not the preceding value F_PBM1 of the master bag negative pressure request flag is "1" (step 23). If the result of determination at step 23 is NO, i.e., when F_PBM1=0, indicating that no negative pressure was requested to the brake booster 9 at the preceding time, it is determined whether or not the vehicle speed VP detected by the vehicle speed sensor 33 is equal to or lower than a predetermined vehicle speed #X_VPPBM (for example 15 km/h) (step 24). If the result of determination at step 24 is YES, i.e., when VP≦#X_VPPBM, it is determined whether or not the combustion mode monitor S_EMOD is "0" (step 25). If the result of determination at step 25 is YES, i.e., when S_EMOD 0, indicating that the combustion mode of the engine 3 is set to the stratified combustion or homogeneous lean combustion, it is determined whether or not the master bag gage pressure PBGM is equal to or lower than a first predetermined negative pressure #X_PBMLL (for example, 250 mmHg) (step 26). The first predetermined negative pressure #X_PBMLL corresponds to a minimum negative pressure required to amplify the braking force of the brake. If the result of determination at step 26 is YES, i.e., when an actual negative pressure in the intake pipe 4 is so low that the negative pressure can be hardly ensured due to the vehicle remaining in a relatively low speed condition and the throttle valve 10 being fully opened or largely opened, the CPU 2a sets the master bag request flag F_PBM to "1" on the assumption that the negative pressure should be forcedly boosted (step 27), followed by termination of the master bag negative pressure determination subroutine.

On the other hand, if the result of determination at any of steps 24–26 is NO, i.e., when the vehicle speed VP is higher than the predetermined vehicle speed #X_VPPBM, when the combustion mode is set to the homogeneous stoichiometric combustion, or when the master bag gage pressure PBGM is higher than the first predetermined negative pressure #X_PBMLL, the CPU 2a sets the master bag negative pressure request flag F_PBM to "0" on the assumption that the current condition should remain and the negative pressure need not be boosted (step 28), followed by termination of the master bag negative pressure determination subroutine.

If the result of determination at step 23 is YES, i.e., when F_PBM1=1, indicating that a negative pressure was requested at the preceding time, it is determined whether or not the master bag pressure PBGM is equal to or higher than a second predetermined negative pressure #X_PBMHL (for example, 400 mmHg) which is higher than the first predetermined negative pressure #X_PBMLL (step 29).

If the result of determination at step 29 is NO, i.e., when PBGM<#X_PBMHL, the CPU 2a holds the master bag negative pressure request flag F_PBM at "1" on the assumption that the negative pressure request should be maintained as well at the current time (step 31), followed by termination of the master bag negative pressure determination subroutine.

On the other hand, if the result of determination at step 29 is YES, i.e., when PBGM≧#X_PBMHL, the CPU 2a sets the master bag negative pressure request flag F_PBM to "0" on the assumption that the negative pressure has been sufficiently recovered so that the negative pressure need not be requested (step 30), followed by termination of the master bag negative pressure determination subroutine.

By thus setting the lower limit value for determining a request for the negative pressure to different values from each other when the negative pressure has been requested and when not requested, i.e., by providing hysteresis, it is possible to avoid hunting of the determination result and resulting control without fail.

Next, a subroutine for determining a stratified combustion region at step 2 in FIG. 2 will be described with reference to FIGS. 5 and 6. First at step 60, it is determined whether or not an F/C delay flag F_FCDLY is "0." If the result of determination at step 60 is NO, i.e., when F_FCDLY=1, indicating that a predetermined time has not elapsed from the end of F/C, the stratified combustion region determining subroutine is terminated.

On the other hand, if the result of determination at step 60 is YES, i.e., when the predetermined time has elapsed from the end of F/C, it is determined whether or not the preceding value of the combustion mode monitor S_EMOD1 is "2" (step 61).

Figure 7:
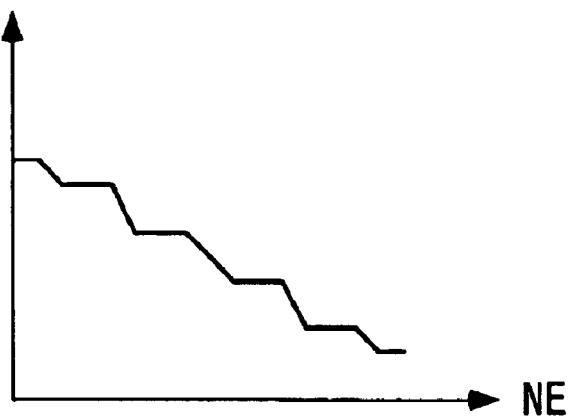
FIG. 7 shows an example of an NE-#PMDIZnHH table for use in the subroutine of FIG. 5.

If the result of determination at step 61 is YES, i.e., when the combustion mode has been set to the stratified combustion at the preceding time, it is determined at subsequent steps 62–65 whether or not a gear shift position NGR of the automatic transmission is at "0"–"3," respectively, i.e., a current gear stage is determined. In accordance with the result of determination at steps 62–65, the CPU 2a sets a stratified combustion available upper limit torque PMDIZNH to predetermined torques #PMDIZ5HH–#PMDIZ1HH for the fifth speed to the first speed for the stratified combustion mode, respectively, at steps 66–70. As described later, the stratified combustion available upper limit torque PMDIZNH is used to determine whether or not the stratified combustion is available at the respective gear stages. The predetermined torques #PMDIZ5HH–#PMDIZ1HH are retrieved from an NE-#PMDIZnHH table, one example of which is shown in FIG. 7, in accordance with the engine rotational speed NE. The NE-#PMDIZnHH tables are provided for the respective shift positions NGR, wherein the predetermined torque #PMDIZnHH is set to a smaller value as the engine rotational speed NE is higher or as the gear stage is at a higher position.

On the other hand, if the result of determination at step 61 is NO, i.e., when S_EMOD1 2, indicating that the preceding combustion mode was set to the homogeneous stoichiometric combustion or homogeneous lean combustion, it is determined whether or not the current master bag negative pressure request flag F_PBM is "0" and the preceding value F_PBM1 of the master bag negative pressure request flag is "1" (step 71).

If the result of the determination at step 71 is YES, i.e., when F_PBM1=1 and F_PBM=0, indicating that the current loop is immediately after a negative pressure was not requested, the routine proceeds to step 62 onward.

Figure 8:
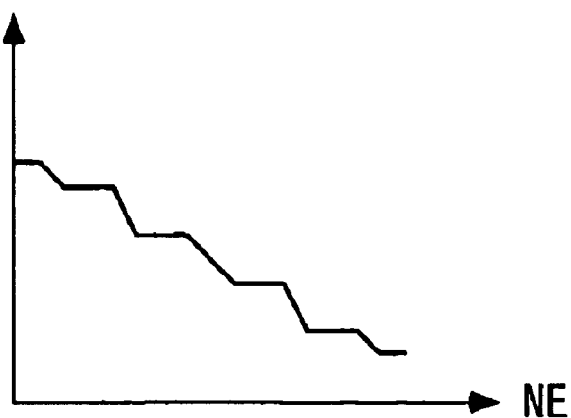
FIG. 8 shows an example of an NE-#PMDIZnHL table for use in the subroutine of FIG. 6.

If the result of determination at step 71 is NO, i.e., F_PBM1=0 and F_PBM=1, indicating that a negative pressure is requested at the current time or when a negative pressure was not requested at the preceding time, it is determined at steps 72–75 in FIG. 6 whether or not a gear shift position NGR of the automatic transmission is at "0"–"3," respectively, in a manner similar to the aforementioned steps 62–65. In accordance with the result of determinations at steps 72–75, the CPU 2a sets the stratified combustion available upper limit torque PMDIZNH to predetermined torques #PMDIZ5HL–#PMDIZ1HL for the fifth speed to the first speed for a combustion mode other than the stratified combustion, respectively, at steps 76–80. These predetermined torques #PMDIZ5HL–#PMDIZ1HL are likewise retrieved from NE-#PMDIZnHL tables provided for the respective shift positions in accordance with the engine rotational speed NE. FIG. 8 shows an example of the NE-#PMDIZnHL table. These predetermined torques #PMDIZnHL are set to smaller values, respectively, as the engine rotational speed NE is higher or as the gear stage is at a higher position. The predetermined torques #PMDIZnHL are also set to values with hysteresis smaller than the predetermined torques #PMDIZnHH for the stratified combustion mode which are set in the NE-#PMDIZnHH table in FIG. 7.

Figure 5:
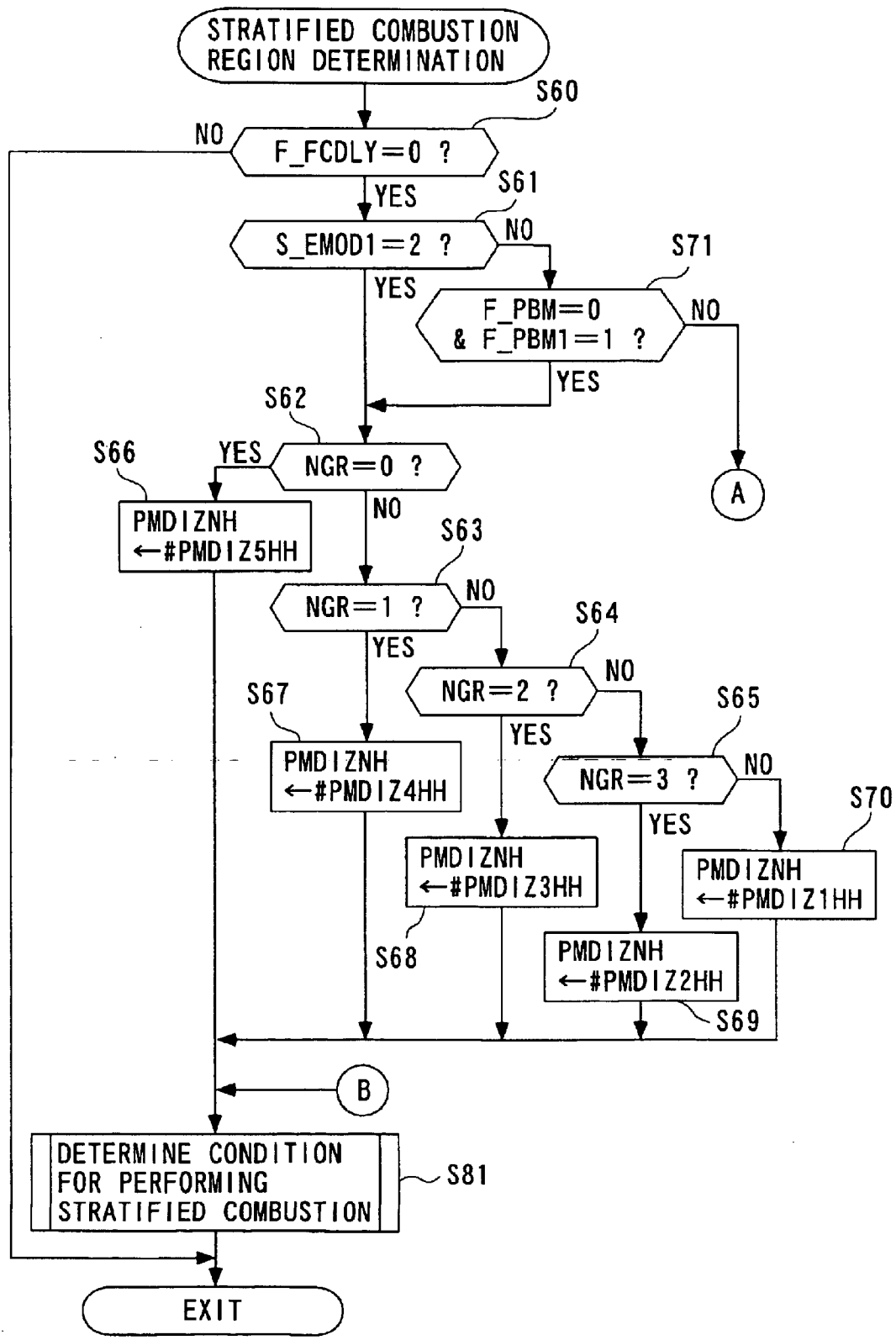

At step 81 in FIG. 5 subsequent to steps 66–70 or 76–80, the CPU 2a determines a condition for executing the stratified combustion, followed by termination of the stratified combustion region determining subroutine.

Figure 9:
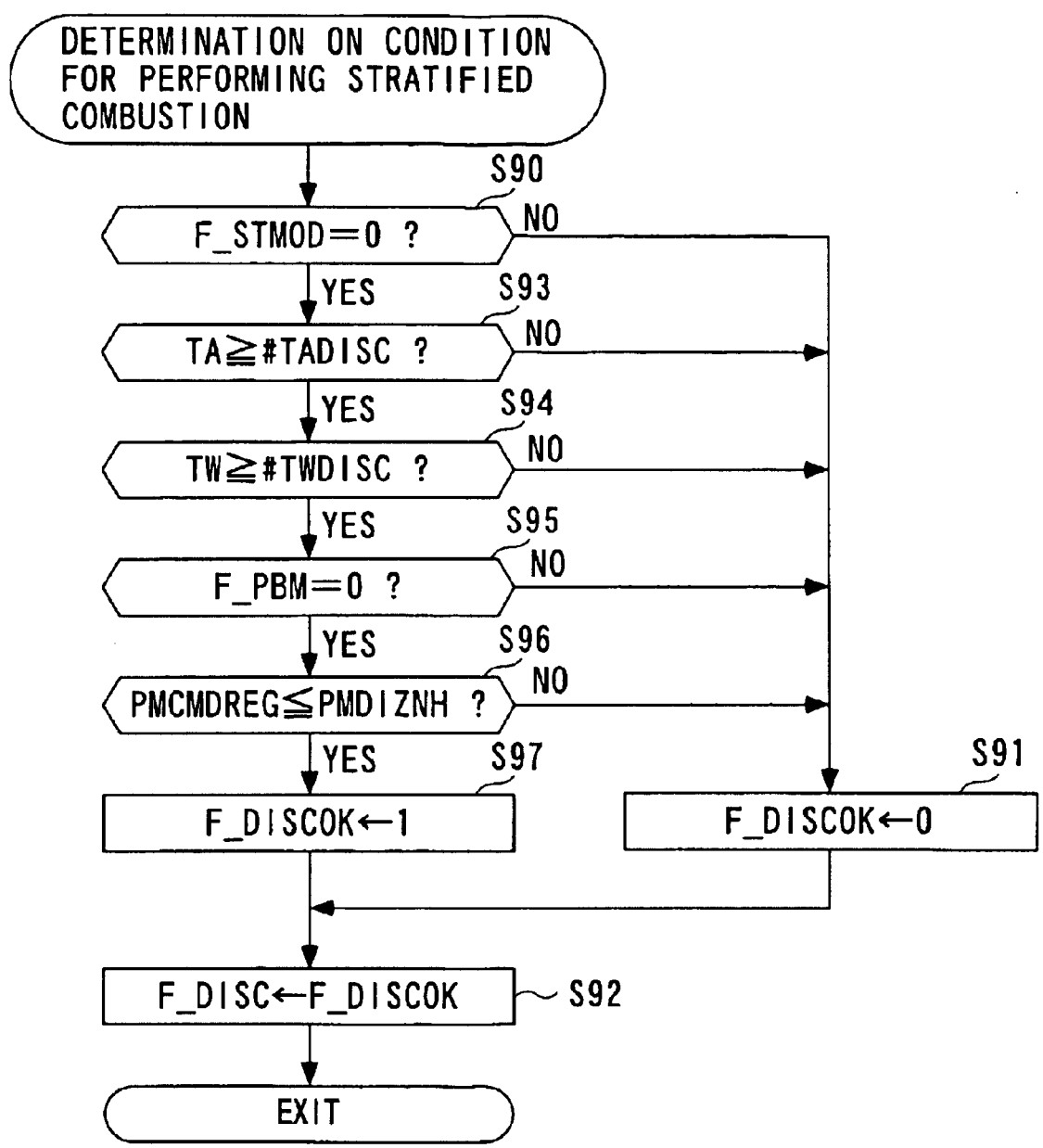
FIG. 9 is a flow chart illustrating a subroutine for determining a condition for performing a stratified combustion at step 81 in FIG. 5.

Next, a subroutine for determining a condition for executing the stratified combustion will be described with reference to FIG. 9. First, at step 90, it is determined whether or not a start mode flag F_STMOD is "0."

If the result of determination at step 90 is NO, i.e., when the engine 3 is in a start mode, the CPU 2a sets a stratified combustion enable flag F_DISCOK to "0" for disabling the stratified combustion mode to be set (step 91), and sets this value to a stratified combustion flag F_DISC (step 92), followed by the stratified combustion execution condition determining subroutine.

On the other hand, if the result of determination at step 90 is YES, i.e., when the engine 3 is not in the start mode, it is determined at step 93 whether or not the intake air temperature TA is equal to or higher than a predetermined lower limit value #TADISC (for example, −10° C.) for the stratified combustion mode, and at step 94 whether or not the engine water temperature TW is equal to or higher than a predetermined lower limit value #TWDISC (for example, 70° C.) for the stratified combustion mode. If the result of determination at any of steps 93 and 94 is NO, the CPU 2a executes step 91 onward on the assumption that the engine 3 is in a low temperature condition so that if the combustion mode is set to the stratified combustion in such a condition, ensured ignition could fail, followed by termination of the stratified combustion execution condition determining subroutine.

If the results of determinations at steps 93 and 94 are both YES, i.e., when TA≧#TADISC and TW≧#TWDISC, indicating that the engine 3 is in a high temperature condition suitable for the stratified combustion, it is determined whether or not the master bag negative pressure request flag F_PBM is "0" (step 95).

If the result of determination at step 95 is NO, i.e., when F_PBM=1, indicating that a sufficient negative pressure is not ensured in the brake booster 9 so that this negative pressure should be boosted, the CPU 2a executes step 91 onward to set the stratified combustion enable flag F_DISCOK to "0," followed by termination of the stratified combustion execution condition determining subroutine. In this way, the combustion mode is disabled to be set to the stratified combustion upon request for a negative pressure, thereby making it possible to prevent the throttle valve 10 from being fully opened to ensure a sufficient negative pressure in the brake booster 9.

If the result of determination at step 95 is YES, i.e., F_PBM=0, indicating that no negative pressure is request, it is determined whether or not the requested torque PMCMDREG retrieved in the routine of FIG. 13 is equal to or lower than the stratified combustion available upper limit torque PMDIZNH retrieved at steps 66–70 or 76–80 (step 96). If the result of determination at step 96 is NO, i.e., PMCMDREG>PMDIZNH, the CPU 2a executes step 91 onward on the assumption that the stratified combustion is not performed, given a higher priority to the output torque of the engine 3, since the requested torque PMCMDREG for the engine 3 is high, followed by the stratified combustion execution condition determining subroutine.

On the other hand, if the result of determination at step 96 is YES, i.e., when PMCMDREG≦PMDIZNH, the CPU 2a sets the stratified combustion enable flag F_DISCOK to "1" on the assumption that the condition is met for executing the stratified combustion since the requested torque PMCMDREG is so low that the fuel economy of the engine 3 is given a higher priority (step 97). Then, the CPU 2a executes step 92, followed by termination of the stratified combustion execution condition determining subroutine.

The homogeneous lean combustion region determination made at the aforementioned step 3 in FIG. 2 is basically identical to the stratified combustion region determination, so that a homogeneous lean combustion execution condition determining routine will be described with reference to FIG. 10 from among the homogeneous lean combustion region determination. This routine is basically substantially similar to the stratified combustion execution condition determining routine described above. First, it is determined at step 100 whether or not the start mode flag F_STMOD is "0" in a manner similar to step 90 in FIG. 9. If the result of determination at step 100 is NO, the CPU 2a sets a homogeneous lean combustion enable flag F_LEANNOK to "0" (step 101), and sets this value to a homogeneous lean combustion flag F_LEANOK (step 102), followed by termination of the homogeneous lean combustion execution condition determining routine.

If the result of determination at step 100 is YES, it is determined at step 103 whether or not the intake air temperature TA is equal to or higher than a predetermined lower limit value #TALEAN (for example, −10° C.) for the homogeneous lean combustion mode, and at step 104 whether or not the engine water temperature TW is equal to or higher than a predetermined lower limit value #TWLEAN (for example, 40° C.) for the homogeneous lean combustion mode. If the result of determination at any of steps 103 and 104 is NO, the CPU 2a executes step 101 onward, followed by termination of the homogeneous lean combustion execution condition determining routine.

If the results of determinations at steps 103 and 104 are both YES, it is determined whether or not the master bag negative pressure request flag F_PBM is "0" (step 105).

If the result of determination at step 105 is NO, i.e., when F_PBM=1, indicating that a negative pressure is requested, the CPU 2a executes step 101 onward to set the homogeneous lean combustion enable flag F_LEANOK to "0," followed by termination of the homogeneous lean combustion execution condition determining routine. In this way, the combustion mode is disabled to be set to the homogeneous lean combustion upon request for a negative pressure, thereby making it possible to control the throttle valve opening TH to a smaller value to ensure the negative pressure.

If the result of determination at step 105 is YES, i.e., when no negative pressure is requested, it is determined whether or not the requested torque PMCMDREG is equal to or smaller than an upper limit torque PMLEANNH for the homogeneous lean combustion mode (step 106). The upper limit torque PMLEANNNH is set in accordance with a gear stage of the automatic transmission in the homogeneous lean combustion region determination, in a manner similar to the aforementioned stratified combustion available upper limit torque PMDIZNH. If the result of determination at step 106 is NO, the CPU 2a executes step 101 onward, followed by termination of the homogeneous lean combustion execution condition determining routine.

On the other hand, if the result of determination at step 106 is YES, the CPU 2a sets the homogeneous lean combustion enable flag F_LEANOK to "1" on the assumption that the condition is met for executing the homogeneous lean combustion (step 107). Then, the CPU 2a executes step 102, followed by termination of the homogeneous lean combustion execution condition determining routine.

Figure 11:
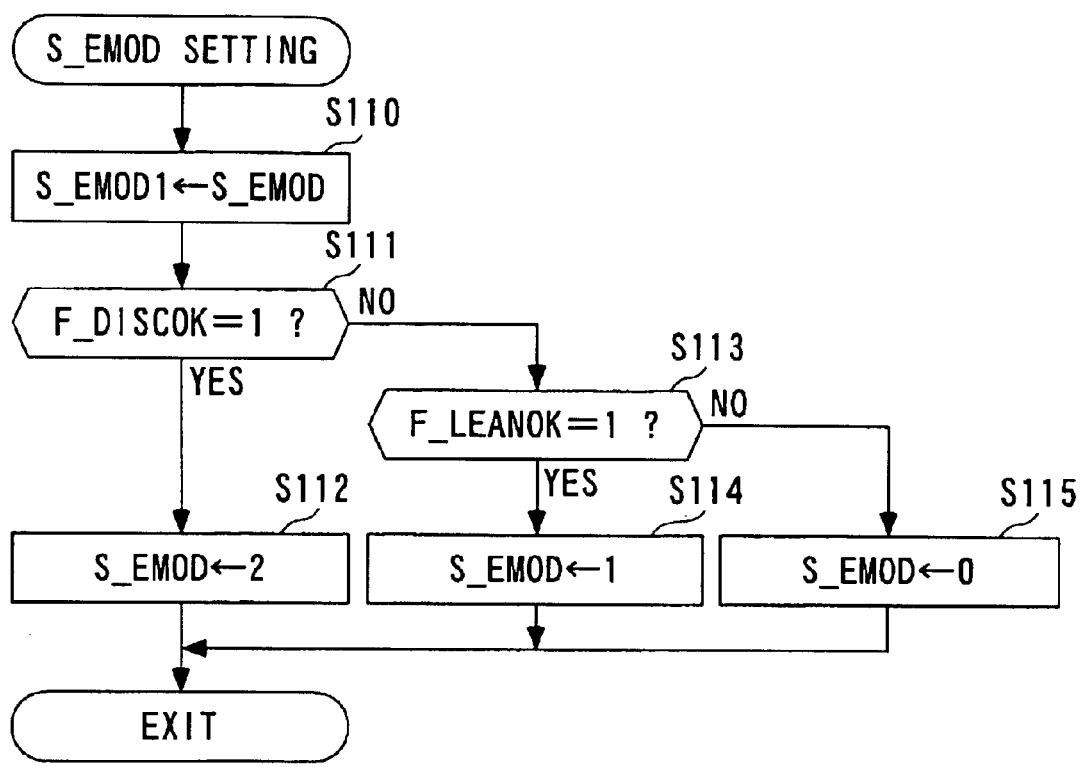
FIG. 11 is a flow chart illustrating a subroutine for setting S_EMOD at step 4 in FIG. 2.

Next, a subroutine for setting the combustion mode monitor S_EMOD at step 4 in FIG. 2 will be described with reference to FIG. 11. First, at step 110, the CPU 2a sets the current combustion mode monitor S_EMOD to its preceding value S_EMD1. It is next determined whether or not the stratified combustion enable flag F_DISCOK is "1" (step 111). If the result of determination at step 111 is YES, the CPU 2a sets the combustion mode monitor S_EMOD to "2" for setting the combustion mode to the stratified combustion (step 112).

Figure 10:
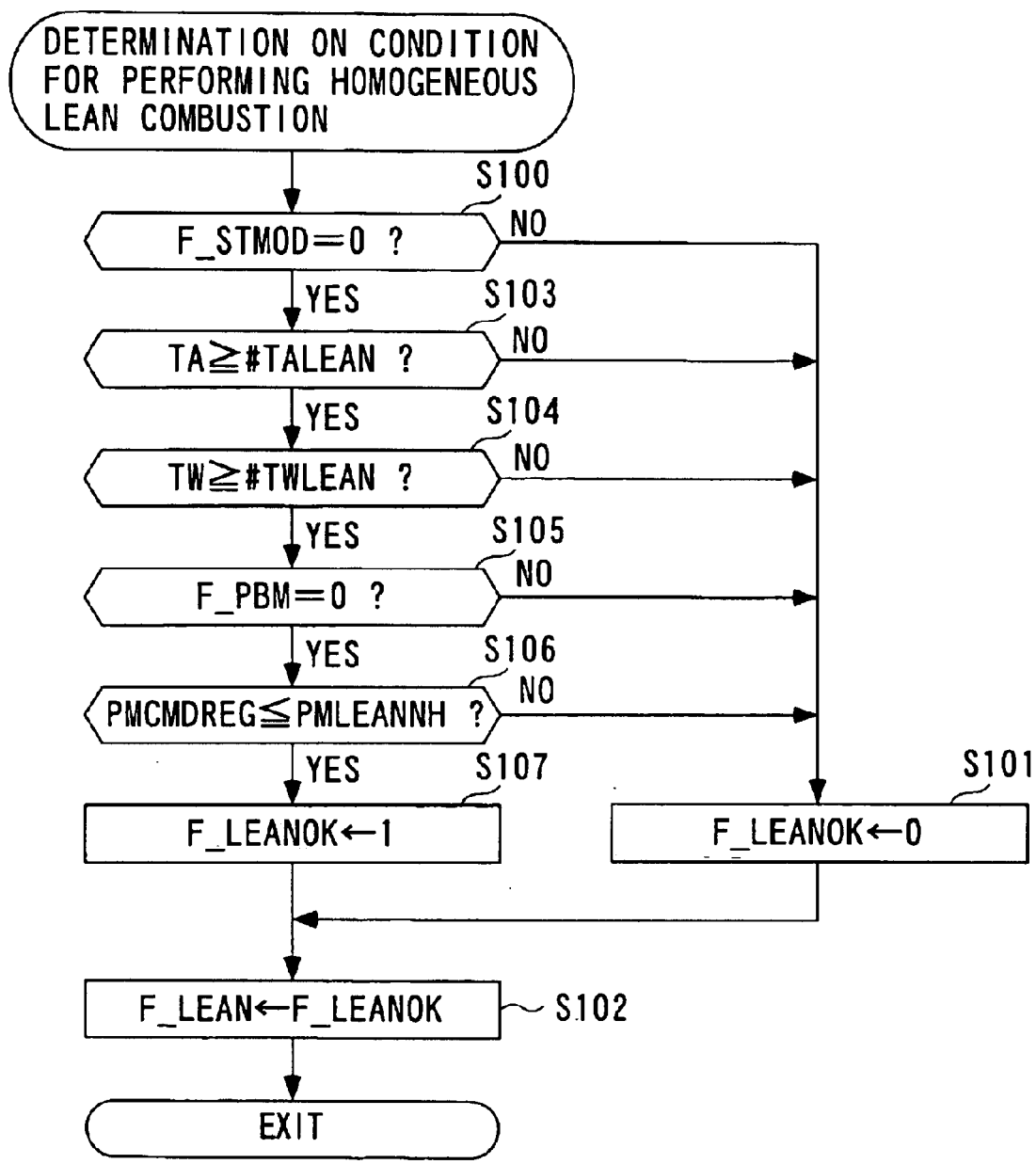
FIG. 10 is a flow chart illustrating a routine for determining a condition for performing a homogeneous lean combustion in the homogeneous lean combustion region determination in FIG. 2.

If the result of determination at step 111 is NO, i.e., when F_DISCOK=0, it is determined whether or not the homogeneous lean combustion enable flag F LEANOK set in the homogeneous lean combustion condition determining routine in FIG. 10 is "1" (step 113). If the result of determination at step 113 is YES, the CPU 2a sets the combustion mode monitor S_EMOD to "1" for setting the combustion mode to the homogeneous lean combustion (step 114).

If the result of determination at step 113 is NO, i.e., when F_LEAKOK=0, indicating that the combustion mode cannot be set to the stratified combustion or homogeneous lean combustion, the CPU 2a sets the combustion mode monitor S_EMOD to "0" for setting the combustion mode to the homogeneous stoichiometric combustion (step 115), followed by termination of the combustion mode monitor setting subroutine.

Figure 14:
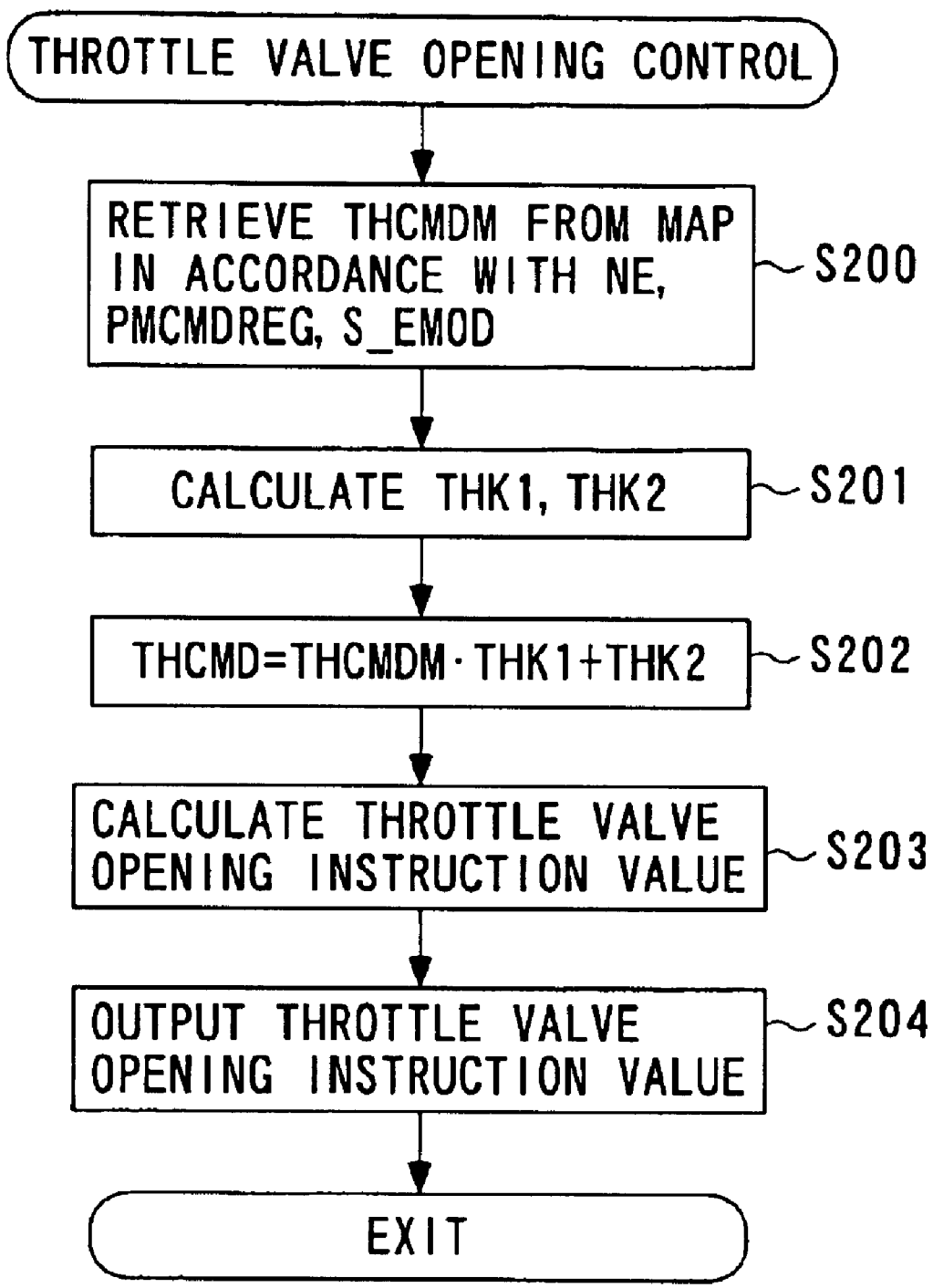
FIG. 14 is a flow chart illustrating a routine for controlling a throttle valve opening.

FIG. 14 is a flow chart illustrating a routine for controlling the throttle valve opening TH at step 122 in FIG. 12. First, at step 200, the CPU 2a retrieves a target throttle valve opening THCMDM from a map, not shown, in accordance with the engine rotational speed NE, the required torque PMCMDREG retrieved in the routine of FIG. 13, and the value of the combustion mode monitor S_EMOD set in the routine of FIG. 11.

Next, the CPU 2a calculates a correction coefficient THK1 and a correction term THK2 in accordance with an operating condition of the engine 3 (step 201), and calculates a target throttle valve opening final value THCMD in accordance with the following equation (step 202):

$$THCMD = THCMDM \cdot THK1 + THK2 \qquad (5)$$

At next step 203, the CPU 2a calculates a throttle valve opening instruction value THP. The throttle valve opening instruction value THP is calculated in accordance with a deviation of the actual throttle valve opening TH from the target throttle valve opening final value THCMD. Then, the CPU 2a outputs a driving signal based on the throttle valve opening instruction value THP to the electric motor 10a (step 204), followed by termination of the throttle valve opening control routine.

The ignition timing control at step 123 in FIG. 12 is conducted in the following manner. First, the CPU 2a retrieves a map value IGMAP for the ignition timing from maps, not shown, provided in accordance with the respective combustion modes, sets IGMAP to a basic ignition timing IGBASi, and calculates a total correction term IGCR. The CPU 2a adds a correction term IGADJ to the sum of the basic ignition timing IGBASi and total correction term IGCR to calculate a final ignition timing IGABi. The correction term IGADJ is provided for correcting a delay of detection signals from a variety of sensors. Then, the CPU 2a outputs the final ignition timing IGABi to the ignition plug 7 as the ignition timing IG, followed by termination of the ignition timing control.

As described above, according to the foregoing embodiment, when the master bag gage pressure PBGM is equal to or lower than the first predetermined negative pressure #X_PBMLL, showing a low negative pressure, the CPU 2a sets the master bag negative pressure request flag F_PBM to "1" to disable the combustion mode to be set to the stratified combustion or homogeneous lean combustion and set the combustion mode to the homogeneous stoichiometric combustion. In this way, the throttle valve opening is controlled to be small in accordance with the target throttle valve opening calculated in accordance with the homogeneous combustion mode based on the throttle valve opening control of FIG. 14. A high negative pressure is maintained in the intake pipe 4 to ensure a negative pressure within the brake booster 9 introduced from the intake pipe 4. In addition, since the combustion mode is set to the homogeneous stoichiometric combustion, a stable combustion can be provided.

When the master bag gage pressure PBGM is equal to or higher than the second predetermined negative pressure #X_PBMHL while the combustion mode is disabled to be set to the stratified combustion or homogeneous lean combustion, the CPU 2a sets the master bag negative pressure request flag F_PBM to "0" to release the disabled combustion mode. It is therefore possible to minimize an exacerbated fuel economy due to the disabled stratified combustion and the like. Also, since the second predetermined negative pressure #X_PBMHL is set larger than the first predetermined negative pressure #X_PBMLL, the combustion mode can be switched without causing hunting.

It should be understood that the present invention is not limited to the embodiment described above, but can be practiced in a variety of manners. For example, it goes without saying that the present invention can be applied to an engine which comprises a negative pressure chamber for temporarily storing a negative pressure in the middle of the branch pipe 8 which connects the intake pipe 4 with the brake booster 9. Otherwise, details in the configuration can be modified as appropriate without departing from the spirit and scope of the present invention.

As described above, the brake negative pressure control apparatus for an internal combustion engine according to the present invention can advantageously ensure a negative pressure within the brake booster and a stable combustion while avoiding complicated controls.

What is claimed is:

1. A brake negative pressure control apparatus for an internal combustion engine of an in-cylinder direct fuel injection type which is configured to set a combustion mode to a stratified combustion or a homogeneous stoichiometric combustion based on a required output in accordance with at least an opening of an accelerator pedal and an operating condition of said internal combustion engine, and is equipped with a brake booster for increasing a braking force of a brake with a negative pressure introduced from an intake pipe, said apparatus comprising:

negative pressure detecting means for detecting a negative pressure within said brake booster;

combustion mode setting disabling means for disabling said combustion mode to be set to said stratified combustion when the detected negative pressure is lower than a first predetermined negative pressure; and control means for controlling a throttle valve opening in accordance with a target throttle valve opening in a homogeneous combustion mode when said combustion mode setting disabling means disables said combustion mode to be set to the stratified combustion.

2. A brake negative pressure control apparatus for an internal combustion engine according to claim 1, wherein said combustion mode further includes a homogeneous lean combustion, wherein said combustion mode setting disabling means disables said combustion mode to be set to said stratified combustion and to said homogeneous lean combustion when said negative pressure is lower than said first predetermined negative pressure.

3. A brake negative pressure control apparatus for an internal combustion engine according to claim 2, wherein said combustion mode setting disabling means releases the disabled combustion mode when said negative pressure is increased to be higher than a second predetermined pressure which is higher than said first predetermined negative pressure while said combustion mode setting disabling means disables said combustion mode to be set to said stratified combustion and to said homogeneous lean combustion.

4. A brake negative pressure control apparatus for an internal combustion engine according to claim 3, wherein said combustion mode setting disabling means continues to disable said stratified combustion and said homogeneous lean combustion when said required output is larger than a predetermined upper limit output after said negative pressure is increased beyond said second predetermined negative pressure.

5. A brake negative pressure control method for an internal combustion engine of an in-cylinder direct fuel injection type which is configured to set a combustion mode to a stratified combustion or a homogeneous stoichiometric combustion based on a required output in accordance with at least an opening of an accelerator pedal and an operating condition of said internal combustion engine, and is equipped with a brake booster for increasing a braking force of a brake with a negative pressure introduced from an intake pipe, said method comprising the steps of:

detecting a negative pressure within said brake booster;

disabling said combustion mode to be set to said stratified combustion when the detected negative pressure is lower than a first predetermined negative pressure; and controlling a throttle valve opening in accordance with a target throttle valve opening in a homogeneous combustion mode when said combustion mode is disabled to be set to the stratified combustion.

6. A brake negative pressure control method for an internal combustion engine according to claim 5, wherein said combustion mode further includes a homogeneous lean combustion, wherein said step of disabling setting of said combustion mode includes disabling said combustion mode to be set to said stratified combustion and to said homogeneous lean combustion when said negative pressure is lower than said first predetermined negative pressure.

7. A brake negative pressure control method for an internal combustion engine according to claim 6, wherein said step of disabling setting of said combustion mode includes releasing the disabled combustion mode when said negative pressure is increased to be higher than a second predetermined pressure which is higher than said first predetermined negative pressure while said combustion mode is disabled to be set to said stratified combustion and to said homogeneous lean combustion.

8. A brake negative pressure control method for an internal combustion engine according to claim 7, wherein said step of disabling setting of said combustion mode includes continuously disabling said stratified combustion and said homogeneous lean combustion when said required output is larger than a predetermined upper limit output after said negative pressure is increased beyond said second predetermined negative pressure.

9. An engine control unit including a control program for causing a computer to carry out control of a brake negative pressure for an internal combustion engine of an in-cylinder direct fuel injection type which is configured to set a combustion mode to a stratified combustion or a homogeneous stoichiometric combustion based on a required output in accordance with at least an opening of an accelerator pedal and an operating condition of said internal combustion engine, and is equipped with a brake booster for increasing a braking force of a brake with a negative pressure introduced from an intake pipe, wherein said control program causes the computer to detect a negative pressure within said brake booster;

disable said combustion mode to be set to said stratified combustion when the detected negative pressure is lower than a first predetermined negative pressure; and control a throttle valve opening in accordance with a target throttle valve opening in a homogeneous combustion mode when said combustion mode is disabled to be set to the stratified combustion.

10. An engine control unit according to claim 9, wherein said combustion mode further includes a homogeneous lean combustion, wherein said control program causes the computer to disable said combustion mode to be set to said stratified combustion and to said homogeneous lean combustion when said negative pressure is lower than said first predetermined negative pressure.

11. An engine control unit according to claim 10, wherein said control program further causes the computer to release the disabled combustion mode when said negative pressure is increased to be higher than a second predetermined pressure which is higher than said first predetermined negative pressure while said combustion mode is disabled to be set to said stratified combustion and to said homogeneous lean combustion.

12. An engine control unit according to claim 11, wherein said control program further causes the computer to continuously disable said stratified combustion and said homogeneous lean combustion when said required output is larger than a predetermined upper limit output after said negative pressure is increased beyond said second predetermined negative pressure.

* * * * *